(12) United States Patent
Matsuzaki et al.

(10) Patent No.: US 8,211,997 B2
(45) Date of Patent: Jul. 3, 2012

(54) PROCESS FOR PRODUCING POLYARYLENE SULFIDE

(75) Inventors: Mitsuhiro Matsuzaki, Fukushima-Ken (JP); Katsumi Horikoshi, Fukushima-Ken (JP); Masanori Kobayashi, Fukushima-Ken (JP)

(73) Assignee: Kureha Corporation, Tokyo (JP)

( * ) Notice: Subject to any disclaimer, the term of this patent is extended or adjusted under 35 U.S.C. 154(b) by 607 days.

(21) Appl. No.: 11/661,753

(22) PCT Filed: Aug. 31, 2005

(86) PCT No.: PCT/JP2005/015938
§ 371 (c)(1),
(2), (4) Date: Apr. 10, 2007

(87) PCT Pub. No.: WO2006/027985
PCT Pub. Date: Mar. 16, 2006

(65) Prior Publication Data
US 2008/0097075 A1    Apr. 24, 2008

(30) Foreign Application Priority Data
Sep. 6, 2004 (JP) ................................ 2004-258823

(51) Int. Cl.
*C08G 75/00* (2006.01)
(52) U.S. Cl. .................................................. 528/391
(58) Field of Classification Search ............. 528/391
See application file for complete search history.

(56) References Cited

U.S. PATENT DOCUMENTS

| | | | |
|---|---|---|---|
| 4,826,017 A * | 5/1989 | Du Bourg et al. ............ 209/234 |
| 5,166,446 A | 11/1992 | Barentsen et al. |
| 5,744,576 A | 4/1998 | Miyahara et al. |
| 6,461,523 B1 * | 10/2002 | Greenrose ..................... 210/770 |
| 2005/0087215 A1 | 4/2005 | Miyahara et al. |

FOREIGN PATENT DOCUMENTS
EP    0 468 559    1/1992
(Continued)

OTHER PUBLICATIONS

Supplementary European Search Report issued Dec. 17, 2007 in International (PCT) Application No. PCT/JP2005015938 of which the present application (U.S. Appl. No. 11/661,753) is the U.S. National Stage.

*Primary Examiner* — Randy Gulakowski
*Assistant Examiner* — Shane Fang
(74) *Attorney, Agent, or Firm* — Wenderoth, Lind & Ponack, L.L.P.

(57) ABSTRACT

In a process for producing polyarylene sulfide, comprising: reacting an alkali sulfide source and an aromatic dihalide compound in a polar organic solvent to obtain a polymerizate slurry containing polyarylene sulfide particles, by-produced alkali metal salt fine particles and the polar organic solvent, and recovering the polyarylene sulfide particles washed from the polymerizate slurry; the polymerizate slurry is separated by sieving into the polyarylene sulfide particles and a slurry containing the alkali metal salt fine particles, and the separated polyarylene sulfide particles are subjected to a washing step wherein the polyarylene sulfides are introduced into a countercurrent washing apparatus enclosing a movable part and subjected therein to continuous countercurrent contact with a washing liquid. As a result, polyarylene sulfide particles of good quality are produced at a good yield, while pursuing process rationalization.

9 Claims, 1 Drawing Sheet

FOREIGN PATENT DOCUMENTS

| | | |
|---|---|---|
| EP | 0 720 998 | 10/1996 |
| EP | 1 452 555 | 1/2004 |
| JP | 4-226536 | 8/1992 |
| JP | 8-183858 | 7/1996 |
| JP | 2004-244619 | 9/2004 |
| WO | 03/048231 | 6/2003 |
| WO | 2004/065457 | 8/2004 |

\* cited by examiner

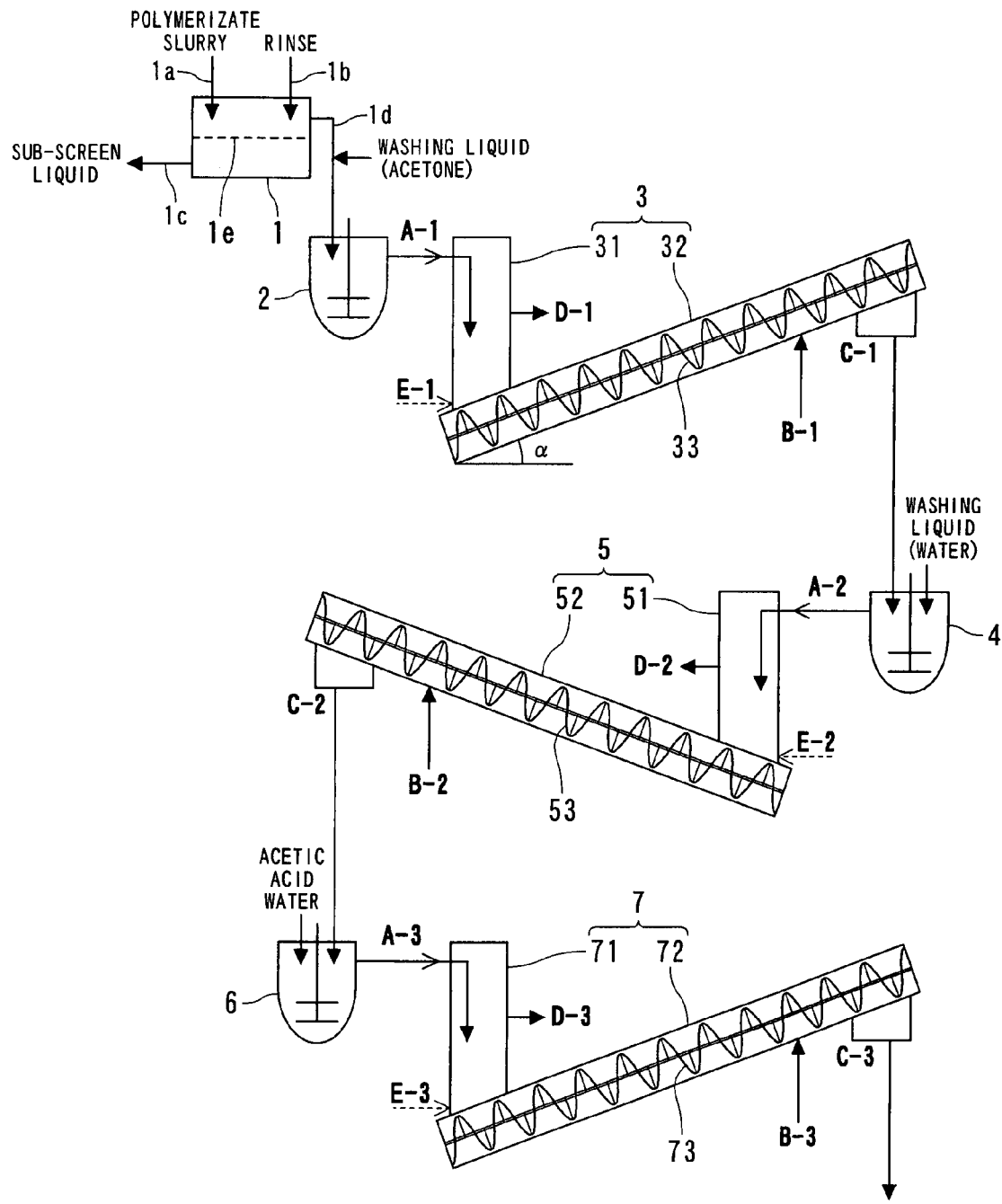

PROCESS FOR PRODUCING POLYARYLENE SULFIDE

TECHNICAL FIELD

The present invention relates to a process for treating a slurry containing at least two types of solid particles, particularly a process for producing polyarylene sulfide by effectively washing to recover polyarylene sulfide particles from a polymerizate slurry containing the polyarylene sulfide particles obtained by reacting an alkali sulfide source and an aromatic dihalide compound in a polar organic solvent.

BACKGROUND ART

A polyarylene sulfide (PAS) resin as represented by polyphenylene sulfide (PPS) is an engineering plastic excellent in heat resistance, chemical resistance, non-flammability, electrical properties and mechanical properties, and is widely used as materials for fiber, films, injection molding and extrusion. The production of a PAS resin through a process of reacting an aromatic dihalide compound and an alkali metal sulfide in an organic polar solvent, such as N-methylpyrrolidone (NMP), is described, e.g., in Patent document 1 listed below. According to the process, a polymerization system in a high-temperature state is withdrawn by flushing into a vessel under a normal or reduced pressure, and is then subjected to recovery of the solvent, washing and drying to recover the resin, thereby finally obtaining a powdery resin product having particle sizes of from several μm to 50 μm. The powdery resin in a dry state is liable to be scattered as dust and is difficult to handle because of a small bulk density. Particularly, the powdery resin is liable to show inferior production efficiency because of a lowering in throughput at the time of melt-extrusion. Further, a PAS resin is generally provided with a level of melt-viscosity necessary for processing through so-called heat cross-linking in a step after the drying, so that the PAS resin is liable to exhibit inferior mechanical or physical properties than linear polymers.

Further, Patent document 2 below has disclosed a process for processing particulate PPS, and in its Examples, the polymerizate is discharged into water, and precipitated polymer beads are recovered and subjected to a repetition of washing with warm water.

For a similar resin, Patent document 3 below has disclosed a process for treating a polymerizate slurry obtained in the polymerization step and containing a particulate PAS. The treating process includes: (1) a step wherein a polymerizate slurry containing polyarylene sulfide particles, by-produced crystalline and dissolved alkali chloride and arylene sulfide oligomers together with the liquid component principally comprising N-methylpyrrolidone, is subjected to sieving for separation into polyarylene sulfide particles and a slurry containing crystallized alkali chloride, (2) a step wherein the slurry containing crystallized alkali chloride is subjected to solid-liquid separation to recover crystallized alkali chloride, while the liquid component is distilled to recover N-methylpyrrolidone, (3) a step of washing the polyarylene sulfide particles with an organic solvent, such as acetone, and water, and (4) a step of distilling the organic solvent washing liquid to recover the organic solvent. Patent document 3 does not disclose the detail of the washing step, whereas it is ostensible to construe that a batchwise washing and filtration operation is intended that requires repetitive washing which leads to a large-size apparatus and an increased production cost.

Patent document 4 below has disclosed a process for washing polyarylene sulfide, wherein polyarylene sulfide particles recovered by sieving from a polymerizate slurry are successively washed with an organic solvent, such as acetone, having a lower boiling point than water and miscible with water and polar organic solvent in the polymerizate slurry, and then with water.

Further, Patent document 5 below discloses a process for washing polyarylene sulfide particles by subjecting polyarylene sulfide particles recovered by removing the solvent from the reaction liquid by means of a filter to a countercurrent contact with a washing liquid in a tubular apparatus having therein static mixing elements disposed successively in series. According to our study, however, a sufficient effect of washing polyarylene sulfide particles cannot be attained according to a countercurrent washing process utilizing such static mixing elements.

In any case, the above-mentioned conventional processes for producing polyarylene sulfide involve many problems arising from the fact that the polymerizate slurry resulting from the polymerization step include many components.

More specifically, in any of the above-mentioned processes, an objective polymerizate slurry containing polyarylene sulfide particles obtained by reaction of an alkali sulfide source and an aromatic dihalide compound in a polar organic solvent, contains not only polyarylene sulfide particles having an average particle size on the order of 200-2000 μm, as a principal object of recovery, but also a polar organic solvent, by-produced alkali metal salt fine particles having an average particle size on the order of 5-100 μm, dissolved alkali metal salt and arylene sulfide oligomer. Such a large number of components in the polymerizate slurry provide an essential difficulty in separation and recovery of product PAS particles, and particularly many problems are encountered in the above-mentioned separation-recovery process including the sieving or filtration as an essential step.

For example, the above-mentioned processes disclosed by Patent documents 3 and 4 both include a step of sieving the polymerizate slurry by using a sieve having a mesh-opening of ca.105 μm so as to recover PAS particles on the sieve while transferring the by-produced alkali metal salt fine particles to the filtrate liquid. It is inevitable to lose PAS particles having particle sizes passing through the sieve mesh-opening, and if the mesh-opening is decreased so as to reduce the loss, the separation between the PAS particles and the alkali metal salt fine particles becomes difficult.

In order to solve the above-mentioned problems, the present inventors, et al., have developed a process for producing polyarylene sulfide which has been rationalized from the process standpoint by omitting the sieving or filtration step that is the source of the above-mentioned problems of the process, subjecting the polymerizate slurry directly to countercurrent washing and repeating the countercurrent washing (Patent document 6 below).

Patent document 1: JP-B 52-12240
Patent document 2: JP-A 59-49232
Patent document 3: JP-A 61-255933
Patent document 4: JP-A 4-139215
Patent document 5: JP-A 3-86287
Patent document 6: WO 03/048231

The process for producing polyarylene sulfide of Patent document 6 above which has been rationalized from the process standpoint of view has faced a quality problem of increased ionic impurities, such as residual alkali, in the product polyarylene sulfide, and a problem of lowering in yield of the product polyarylene sulfide.

DISCLOSURE OF INVENTION

Accordingly, a principal object of the present invention is to provide a process that is capable of producing polyarylene sulfide of good quality at good yield while pursuing the process rationalization.

According to further study of the present inventors, it has been discovered that the above-mentioned problem of increased ionic impurities in the product polyarylene sulfide found in the process of Patent document 6 has arisen from distribution of apparently insignificant entrained components, particularly polyarylene sulfide oligomers, in separation between the product polyarylene sulfide and the by-produced alkali metal salt fine particles.

More specifically, in the process of Patent document 6, alkali metal salt fine particles that are separated from polyarylene sulfide particles according to the above-mentioned processes of Patent document 3, etc., including a sieving step, are subjected to the countercurrent washing step together with polyarylene sulfide particles, and the alkali metal salt fine particles are essentially removed from the polyarylene sulfide particles by using a solvent selectively dissolving them, e.g., water. However, it has been found that the polyarylene sulfide oligomers that are separated together with the alkali metal salt fine particles from the polyarylene sulfide particles in the sieving step are entrained with or attached to the alkali metal salt fine particles to obstruct the selective washing of the alkali metal salt fine particles in the countercurrent washing step, thereby leading to the increase in residual alkali amount in the product polyarylene sulfide and lowering in yield of the product polyarylene sulfide.

As a result, the present inventors have found that sieving (not filtration) is an indispensable step in order to improve the quality of product polyarylene sulfide and the combination thereof with an effective countercurrent washing step as in Patent document 6 is optimum for effective production of polyarylene sulfide of good quality, thus arriving at the present invention.

More specifically, according to the present invention, there is provided a process for producing polyarylene sulfide, comprising: reacting an alkali sulfide source and an aromatic dihalide compound in a polar organic solvent to obtain a polymerizate slurry containing polyarylene sulfide particles, by-produced alkali metal salt fine particles and the polar organic solvent, and recovering the polyarylene sulfide particles washed from the polymerizate slurry; wherein the polymerizate slurry is separated by sieving into the polyarylene sulfide particles and a slurry containing the alkali metal salt fine particles, and the separated polyarylene sulfide particles are subjected to a washing step wherein the polyarylene sulfide particles are introduced into a countercurrent washing apparatus enclosing a movable part and subjected therein to continuous countercurrent contact with a washing liquid.

BRIEF DESCRIPTION OF THE DRAWING

FIG. 1 is a schematic illustration of an embodiment of production apparatus system suitable for practicing a process for producing polyarylene sulfide according to the present invention.

1: sieve apparatus (1a: polymerizate slurry feed port, 1b: rinse liquid feed port, 1c: sub-screen liquid discharge port, 1d: PAS particles discharge port, 1e: screen), 2, 4, 6: PAS particles re-slurrying vessel; 3: first washing apparatus (31: vertical tube, 32: inclined tube, 33: screw); 5: second washing apparatus (51: vertical tube, 52: incline tube, 53: screw); 7: third washing apparatus (71: vertical tube, 72: inclined tube, 73: screw), A-1, A-2, A-3: slurry feed port; B-1, B-2, B-3: washing liquid feed port; C-1, C-2, C-3: PAS particle wet cake discharge port; D-1, D-2, D-3: washing waste liquid discharge port; E-1, E-2, E-3: additional washing liquid feed port disposed as needed.

BEST MODE FOR PRACTICING THE INVENTION

A preferred embodiment of the present invention will be described below with reference to a drawing.

FIG. 1 is a schematic illustration of an embodiment of production apparatus system suitable for practicing a process for producing polyarylene sulfide (hereinafter sometimes abbreviated as "PAS") according to the present invention. Referring to FIG. 1, the apparatus system includes a sieve apparatus 1, a first re-slurrying vessel 2, a first washing apparatus 3, a second re-slurrying vessel 4, a second washing apparatus 5, a third re-slurrying vessel 6 and a third washing apparatus 7, which are arranged generally in series. The sieve apparatus 1 comprises, e.g., a horizontal vibrating screen. Each of the first to third washing apparatus 3, 5 and 7 includes a former section (31, 51, 71) of a vertical tube shape for moving PAS particles downwards and a latter section (32, 52, 72) of an inclined tube shape inclined at an angle $\alpha$ of, e.g., 5-60 degrees with respect to the horizon for moving the PAS particles upwards. The latter section encloses therein a screw (33, 53, 73) for conveying the PAS particles.

PAS polymerizate slurry processed by the apparatus will now be described.

PAS polymerizate slurry to be processed or treated by the present invention is a polymerizate slurry containing polyarylene sulfide particles obtained through a reaction of an alkali sulfide source and an aromatic dihalide compound in a polar organic solvent, a by-produced alkali metal salt and the polar organic solvent and.

(a) Polar Organic Solvent

The polar organic solvent may, for example, include organic amide compounds, lactam compounds, urea compounds, and cyclic organic phosphorus compounds. Specific examples thereof may include: N,N-dimethylformamide, N,N-dimethylacetamide, N,N-diethylacetamide, N,N-dipropylacetamide, N,N-dimethylbenzamide, caprolactam, N-methyl-caprolactam, N-ethylcaprolactam, N-isopropylcaprolactam, N-isobutyl-caprolactam, N-n-propylcaprolactam, N-n-butylcaprolactam, N-cyclohexyl-caprolactam, N-methyl-2-pyrrolidone, N-ethyl-2-pyrrolidone, N-isopropyl-2-pyrrolidone, N-isobutyl-2-pyrrolidone, N-n-propyl-2-pyrrolidone, N-n-butyl-2-pyrrolidone, N-cyclohexyl-2-pyrrolidone, N-methyl-3-ethyl-2-pyrrolidone, N-ethyl-3-methyl-2-pyrrolidone, N-methyl-3,4,5-trimethyl-2-pyrrolidone, N-methyl-2-piperidone, N-ethyl-2-piperidone, N-isopropyl-2-piperidone, N-methyl-6-methyl-2-piperidone, N-methyl-3-ethyl-2-piperidone, tetramethylurea, N,N'-dimethyl-ethyleneurea, N,N'-dimethylpropyleneurea, 1-methyl-1-oxosulfolane, 1-ethyl-1-oxosulfolane, 1-phenyl-1-oxosulfolane, 1-n-propyl-1-oxosulfolane, and 1-phenyl-1-oxosulfolane.

The polar organic solvents may be used singly or in mixture of two or more species.

Among the various polar organic solvents, aprotic organic amides and lactams are preferred, and among these, N-alkyllactams and N-alkyl-pyrrolidones are preferred, of which N-methyl-2-pyrrolidone (NMP) is particularly suitable.

(b) Alkali Sulfide Source

The alkali sulfide source (compound) is a material functioning as a sulfur source for the product PAS. Examples thereof include: alkali sulfides and also alkali hydrosulfides. More specifically, examples of alkali sulfides may include: lithium sulfide, sodium sulfide, potassium sulfide, rubidium sulfide, and cesium sulfide. Among these, sodium sulfide and lithium sulfide are preferred, and sodium sulfide is particularly preferred. Further, examples of alkali hydrosulfides may include: lithium hydrosulfide, sodium hydrosulfide, potassium hydrosulfide, rubidium hydrosulfide, calcium hydrosulfide and cesium hydrosulfide. Among these, sodium hydrosulfide and lithium hydrosulfide are preferred, and sodium hydrosulfide is particularly preferred. In the case of using an alkali hydrosulfide, it is preferred to co-use an alkali hydroxide.

(c) Aromatic Dihalide Compound

Examples of the aromatic dihalide compound as a starting monomer may include: dihalobenzenes, such as m-dihalobenzene and p-dihalobenzene, alkyl-substituted dihalobenzenes and cycloalkyl-substituted dihalobenzenes, such as 2,3-dihalotoluene, 2,5-dihalotoluene, 2,6-dihalotoluene, 3,4-dihalotoluene, 2,5-dihaloxylene, 1-ethyl-2,5-dihalobenzene, 1,2,4,5-tetramethyl-3,6-dihalobenzene,1-normalhexyl-2,5-dihalobenzene and 1-cyclohexyl-2,5-dihalobenzene; aryl-substituted dihalobenzenes, such as 1-phenyl-2,5-dihalobenzene, 1-benzyl-2,5-dihalobenzene, and 1-p-toluyl-2,5-dihalobenzene; dihalobiphenyls, such as 4,4'-dihalobiphenyl; dihalonaphthalenes, such as 1,4-dihalonaphthalene, 1,6-dihalonaphthalene and 2,6-dihalonaphthalene; 3,5-dihalobenzoic acid, 4,4-dihalodiphenyl ether, 4,4-dihalodiphenyl ketone, 4,4-dihalodiphenyl sulfide, and 4,4'-dihalo-diphenyl sulfoxide.

The two halogen elements in these aromatic dihalide compounds may respectively be fluorine, chlorine, bromine or iodine, and may be identical or different from each other.

Among the above-mentioned aromatic dihalide compounds, dihalobenzenes are preferred, and one principally comprising p-dichlorobenzene is particularly preferred.

(d) Reaction

As for the reaction processes using the respective components described above, those known for producing PAS may appropriately be adopted, but processes capable of providing PAS particles having an average particle size of 100 µm or larger are desirably used. For example, a process disclosed in JP-A61-7332 may be used. In the process, an alkali sulfide source and an aromatic dihalide compound is subjected to two stages of polymerization in a polar organic solvent. More specifically, one mol of charged alkali sulfide source is first reacted with an aromatic dihalide compound at 180-235° C. in a medium comprising 0.2-5 liters of polar organic solvent and 0.5-2.4 mols of water until a conversion of 50-95 mol % of the aromatic dihalide compound, and is then further reacted at 245-290° C. after addition of further water so as to provide 2.5-7.0 mols of water per mol of the charged alkali sulfide source, thereby producing particulate PAS. According to this process, it is possible to obtain a polymerizate slurry which is substantially free from PAS particles having particle sizes of below 100 µm and in which most of by-produced alkali metal salt is precipitated as fine particles providing an average particle size of ca.5-100 µm.

According to a particularly preferred embodiment, $Na_2S$ or NaHS (+NaOH) is used as the alkali sulfide source, p-dichlorobenzene is used as the aromatic dihalide compound and NMP is used as the polar organic solvent, to provide a PAS polymerizate slurry containing, in addition to product PPS particles, crystalline NaCl, dissolved NaCl, phenylene sulfide oligomer and paradichlorobenzene, together with the solvent NMP and water.

Now, an embodiment of treating a polyarylene sulfide polymerizate slurry as described above in the apparatus of FIG. 1, is described.

PAS polymerizate slurry is introduced into a sieve apparatus 1 comprising, e.g., a horizontal vibrating screen, from a feed port 1a thereof and subjected to sieving together with a small amount of rinse liquid (which is suitably a washing liquid or a washing waste liquid from a subsequent step) optionally introduced through a feed port 1b for smoothly performing the sieving operation, whereby a sub-screen liquid (or an alkali metal salt fine particle-containing slurry) including a polar organic solvent such as NMP (N-methylpyrrolidone), by-produced alkali metal salt fine particles having an average particle size of ca. 5-100 µm, a dissolved alkali metal salt and arylene sulfide oligomers, is passed through a vibrating screen 1e and discharged through a discharge port 1c. The sub-screen liquid is then subjected to steps, such as separation of alkali metal salt fine particles by solid-liquid separation and recovery of the polar organic solvent (hereinafter representatively called "NMP") by distillation of the liquid components in a similar manner as disclosed in Patent document 3. On the other hand, PAS particles discharged through a discharge port 1d is subjected successively to washing steps with washing liquids described below.

The PAS particles are introduced into a first re-slurrying vessel 2 together with a portion of washing liquid (a solvent, such as acetone or methanol, which is miscible with the polar organic solvent (represented by NMP) used for the reaction and has a lower boiling point than water, hereinafter representatively called "acetone") to form a PAS particle slurry, which is then introduced into a first washing apparatus 3. In the first washing apparatus 3, the PAS particleslurry is introduced through a feed port A-1 into a vertical tube-shaped former section 31, where the PAS particles are subjected to washing with acetone supplied through a feed port B-1 in a latter section while settling or flowing down under gentle stirring by means of trays or a stirring machine optionally disposed in the former section 31. The PAS particles having reached the bottom of the vertical tube are then subjected to further washing by countercurrent contact with the acetone introduced through the feed port B-1 disposed at an intermediate point in an upper side of the inclined tube 32 while being scooped up by a rotating screw 33 provided in an inclined tube 32 in the latter section and moved upwards in the inclined tube 32. The PAS particles having passed through the position of the feed port B-1 and further moved upwards are discharged in the form of a wet cake wetted principally with acetone out of a discharge port C-1 disposed at a position proximate to the top of the inclined tube 32.

NMP as the polar organic solvent separated from the PAS particles in the above-mentioned countercurrent contact step is discharged together with acetone as the washing liquid through a discharge port D-1 disposed at a middle or upper position of the vertical tube 31 in the former section and is separated into NMP and acetone by distillation in a subsequent stage.

The PAS particles in a wet cake-form wetted principally with acetone and discharged from the above-mentioned first countercurrent washing step is then introduced into a second re-slurrying vessel 4 together with a portion of the second washing liquid (water) supplied principally from a feed port B-2 described later to form a PAS particle slurry, which is then introduced into a second washing apparatus 5 and is similarly subjected to countercurrent contact as in the first washing apparatus 3 but with water supplied through a feed port B-2 instead of acetone in a former section of a vertical tube 51 and a latter section of an inclined tube 52, followed by draining from water while being further moved upwards after passing the position of the port B-2, to be discharged out of a discharge port C-2 at a position proximate to the top of the inclined tube 52, as PAS particles in a wet cake-form wetted principally with water. On the other hand, from a discharge port D-2 disposed at a middle or upper position of the vertical tube, acetone that has been separated from the PAS particles according to the above-mentioned washing operation is discharged together with water and recovered by distillation in a later stage.

The PAS particles in a wet cake-form discharged out of the above-described second countercurrent contact step can provide product PAS particles by drying them as they are but may preferably be subjected to an acid treatment for increasing the crystallization temperature of the product PAS particles.

More specifically, the water-wetted PAS particles from the discharge port C-2 of the second washing apparatus 5 are introduced into a third re-slurrying vessel 6 together with a solution of an acid (e.g., an inorganic acid, such as hydrochloric acid, sulfuric acid or phosphoric acid; a salt of a strong acid and a weak base, such as ammonium chloride; or an organic acid, such as acetic acid or formic acid) in water or a mixture solvent principally comprising water together with a water-miscible solvent, such as an alcohol (e.g., acetic acid aqueous solution, in the embodiment shown in FIG. 1), and treated with the acid while being re-slurried in the vessel 6. The resultant slurry is then introduced into a third washing apparatus 7, wherein the PAS particles are washed with water introduced through a feed port B-3 similarly as in the second washing apparatus 5 and are further elevated to be drained from water and discharged out of a discharge port C-3, followed by drying, to be recovered as product PAS particles after acid treatment. The washing waste liquid from the discharge port D-3 is a dilute acid, which can be introduced as desired into an acid-recovery step or otherwise can be discharged out of the apparatus system as it is since it is almost harmless.

Incidentally, it is possible to provide an additional washing liquid-feed port E-1, E-2 or E-3, as desired, at the bottom of any one of the former sections 31, 51 and 71 of the first to third washing apparatus, and supply therethrough washing liquids similar to the one supplied through B-1, B-2 or B-3, respectively, thereby increasing the washing efficiency in the former sections. As a preferred embodiment of a vertical solid-liquid contact apparatus as a former section of a first to third washing apparatus in such an embodiment of supplying an additional washing liquid, it is possible to use "a vertical solid-liquid contact apparatus, comprising: a plurality of stirring chambers disposed vertically adjacent to each other in series, a plurality of partitioning plates each partitioning an adjacent pair of the stirring chambers and provided with a communicating hole for communication between the adjacent pair of the stirring chambers, and a liquid inlet and a solid inlet provided at an upper part and a lower part of the apparatus; each stirring chamber having an inner side wall defining the stirring chamber, a radially ejecting stirring blade, and at least one baffle fixed on the inner side wall so as to extend vertically; the stirring blade and the baffle being positionally biased to a lower side of the stirring chamber" disclosed in an international application PCT/JP2005/014141 (the disclosure of which is incorporated herein by reference).

EXAMPLE

Hereinbelow, the present invention will be described more specifically with reference to Examples and Comparative Examples.

⟨Preparation of Polymerizate Slurry⟩

A 200 liter-autoclave (reaction vessel) was charged with 60 kg of NMP and 38 kg of sodium sulfide penta-hydrate containing 46.30 wt. % of sodium sulfide ($Na_2S$), and after aeration with nitrogen gas, gradually elevated to a temperature of 200° C. under stirring within 3.5 hours to distil out 16.5 kg of water and 11 kg of NMP while 5.0 mols of $H_2S$ was removed by vaporization. Accordingly, the effective amount of $Na_2S$ remaining in the vessel after the dehydration step was 220.4 mols. The amount of the vaporized $H_2S$ corresponded to 2.22 mol % of the charged $Na_2S$. After the dehydration step, the reaction vessel containing 220.4 mols of effective $Na_2S$ was cooled to 180° C., and further charged with 34.35 kg of paradichlorobenzene (p-DCB)[p-DCB/ $Na_2S$=1.06(by mol)], 28.15 kg of NMP, 1.83 kg of water [(total water in the vessel)/$Na_2S$=1.40(by mol) and 133 g of NaOH (at a purity of 97%) so as to provide a total amount of NaOH in the vessel in a proportion of 6.00 mol % of the effective $Na_2S$. Under stirring, the system was subjected to reaction for 4.5 hours at 220° C., and on further continuation of stirring, further charged with 4.17 kg of pressurized water as a phase separation agent [total water in the vessel/$Na_2S$=2.45(by mol)], followed by heating to 255° C. and 2.0 hours of reaction. The total polymerization time amounted to 6.5 hours. After completion of the polymerization, the power supply to the heater was turned off, and the system was cooled to room temperature, whereby a polymerizate slurry containing PPS particles having an average particle size of ca.400 μm.

EXAMPLE 1

The above-obtained polymerizate slurry was processed by an apparatus system having a structure essentially as shown in FIG. 1. In the apparatus system, the sieve apparatus 1 was a horizontal vibrating sieve or screen including a metal screen 1e having a mesh opening of 105 μm, and a sieving operation was performed while introducing acetone as a rinse liquid through a feed port 1b at a rate of ca. 10 liter per 10 kg of PPS particles in the slurry for smoothly performing the sieving. As a result, a wet cake principally comprising PPS particles was obtained by removing by-produced alkali metal salt (NaCl) fine particles, polar organic solvent (NMP) and PP}S oligomer.

The thus-obtained wet cake principally comprising PPS particles was continuously processed in the apparatus system of FIG. 1 (including the apparatus units of the first re-slurrying vessel 2, et seq.). The first to third re-slurrying vessels 2, 4 and 6 each have an inner volume of 10 liter, and the first to third washing apparatus 3, 5 and 7 all have identical dimensions. More specifically, the former sections 31, 51 and 71 of the washing apparatus 3, 5 and 7 each comprise a vertical hollow tube having a straight tube portion measuring 70 mm in its inner diameter and having a total height of ca. 1 m. Further, the latter sections 32, 52 and 72 each comprise a hollow inclined tube disposed at an inclination angle of ca. 20 deg. and having an inner diameter of 70 mm and a length of 2 m, and also an internally disposed screw having a length of 2 m, an outer diameter of 65 mm, a shaft diameter of 24 mm and a pitch of 60 mm and rotated at 8 rpm.

In the apparatus system, the wet cake obtained through the above-described sieving was introduced through a feed port A-1 and re-slurried with acetone in a re-slurrying vessel 2 to form an acetone slurry having a resin concentration of ca. 20%, which was then continuously supplied to a No. 1 washing apparatus 3 at a rate of 15.0 kg/h (corresponding to 3.0 kg/h of PPS particles) while acetone was supplied at a rate of 12.0 kg/h through a feed port B-1. From a discharge port C-1, a wet cake wetted with acetone was discharged, and the remaining liquid was discharged through an effluent port D-1.

The wet cake discharged out of C-1 was further re-slurried with 15.0 kg/h of water in a re-slurrying vessel 4, from which an overflowing effluent slurry was supplied to a feed port A-2 of a No. 2 washing apparatus 5, while water was supplied at a rate of 15.0 kg/h through a feed port B-2. From a discharge port C-2, a wet cake wetted with water was discharged, and the remaining liquid was discharged through an effluent port D-2.

The wet cake discharged out of C-2 was further re-slurried with acetic acid aqueous solution at a concentration of 0.5 wt. % in a re-slurrying vessel 6, from which an effluent slurry was supplied to a feed port A-3 of a No. 3 washing apparatus 7 while water was supplied at a rate of 9.0 kg/h through a feed port B-3. From a discharge port C-3, a wet cake wetted with water was discharged, and the remaining liquid was discharged out of D-3.

At a time of 8 hours from the start of supply of the sieved wet cake to A-1, a portion (ca. 1000 g) of the wet cake continuously discharged out of C-3 was sampled and dried in a box-type drier at 105° C. for 24 hours to obtain ca. 380 g of product PPS particles. The polyarylene sulfide particles showed a melt viscosity of 25 Pa.s, a crystallization temperature on temperature decrease of 229° C., residual sodium of 43 ppm and corrosive HCl gas evolution (at 280° C., 90 min. in air environment) of 32 ppm in the product. Further, the total amount of polyarylene sulfide particles contained in the liquids discharged out of the ports D-1, D-2 and D-3 was 0.3% (0.01 kg/h) of the supply. Herein, polyarylene sulfide particles refer to particles having sizes remaining on the metal screen of 105 μm when sieved therethrough.

COMPARATIVE EXAMPLE 1

A wet cake containing crystalline by-produced alkali metal salt in addition to polyarylene sulfide particles by processing the polymerizate slurry with a centrifuge instead of the sieving by means of the sieve having a mesh opening of 105 μm to separate only the liquid fraction and processing the wet cake in a similar manner by means of the apparatus system (including the apparatus units of the first re-slurrying vessel 2, et seq.) used in Example 1. The resultant polyarylene sulfide particles showed a melt viscosity of 27 Pa.s, a crystallization temperature on temperature decrease of 218° C., residual sodium of 179 ppm and corrosive HCl gas evolution (at 280° C., 90 min. in air environment) of 123 ppm. Further, the total amount of lost polyarylene sulfide particles contained in the liquids discharged out of the ports D-1, D-2 and D-3 was ca. 10.3% (0.31 kg/h) of the supply. Particularly, a large amount was contained in the effluent liquid out of the discharge port D-2 of the No.2 washing apparatus 5. This is considered to be because when the by-produced alkali metal salt fine particles were dissolved, oligomers captured in the fine particles were liberated to float and the floating oligomers obstructed the settling of polyarylene sulfide particles.

COMPARATIVE EXAMPLE 2

The wet cake (water content: 62%) of polyarylene sulfide particles obtained in Comparative Example 1 and having a high residual sodium content of 179 ppm were further washed batchwise with ca. 5 times in amount of water, de-watered and dried to measure a residual sodium content, whereby a value of 167 ppm was attained failing to show a substantial decrease. This means that the low residual sodium content in Example 1 was accomplished not for such a simple reason as a result of an initially low residual sodium content owing to removal of the by-produced alkali metal salt by sieving as a stage presiding the washing. In other words, in Comparative Example 1, the initial residual alkali metal salt concentration of polyarylene sulfide particles subjected to washing was high because only the liquid fraction was removed by centrifugation and not by sieving, this does not directly lead to a high residual sodium content in Comparative Example 1 when the polyarylene sulfide particles were subjected to washing in similar manners as in Example 1. It is considered as a probable reason that in Comparative Example 1, the PPS fine particles or oligomers (which were removed together with alkali fine particles in Example 1) were present in the washing step to obstruct the removal by selective dissolution of the alkali metal salt.

Industrial Applicability

As described above, according to the present invention, there is provided a process for producing polyarylene sulfide which allows the production of polyarylene sulfide of good quality at a good yield while pursuing the process rationalization.

The invention claimed is:

1. A process for producing polyarylene sulfide, comprising the steps of:
reacting an alkali sulfide source and an aromatic dihalide compound in a polar organic solvent to obtain a polymerizate slurry containing polyarylene sulfide particles, by-produced alkali metal salt fine particles, by-produced polyarylene sulfide oligomer and the polar organic solvent,
feeding the polymerizate slurry into a horizontal vibrating screen through a slurry feed port at one end, said vibrating screen further having a sub-screen liquid withdrawal port and a solid discharge port,
withdrawing a slurry containing the alkali metal salt fine particles, the polyarylene sulfide oligomer and the polar organic solvent through the sub-screen liquid withdrawal port of the vibrating screen and,
withdrawing the polyarylene sulfide particles through the solid discharge port of the vibrating screen,
re-slurrying the withdrawn polyarylene sulfide particles with a re-slurrying liquid in a re-slurrying vessel equipped with a stirrer,
introducing the re-slurried polyarylene sulfide particles into a countercurrent washing apparatus enclosing a movable part and subjecting the polyarylene sulfide particles to continuous countercurrent contact with a washing liquid to wash the polyarylene sulfide particles, and
recovering the washed polyarylene sulfide particles,
wherein the re-slurrying liquid and the washing liquid are each a liquid which is miscible with the polar organic solvent and has a lower boiling point than water, and
wherein the solid discharge port is not directly connected to the countercurrent washing apparatus.

2. The production process according to claim 1, wherein the countercurrent washing apparatus includes a former section wherein the polyarylene sulfide particles are moved as a downward flow, and a latter section wherein the polyarylene sulfide particles are moved as an upward flow.

3. The production process according to claim 2, wherein the latter section comprises an inclined tube enclosing therein a conveying screw.

4. The production process according to claim 1, wherein the polar organic solvent comprises N-methylpyrrolidone, and the washing solvent comprises acetone.

5. The production process according to claim 1, further comprising the steps of:
- re-slurrying the washed polyarylene sulfide particles with water in a re-slurrying vessel equipped with a stirrer,
- introducing the re-slurried polyarylene sulfide particles into a countercurrent washing apparatus enclosing a movable part and subjecting the polyarylene sulfide particles to continuous countercurrent contact with the water to wash the polyarylene sulfide particles, and
- recovering the washed polyarylene sulfide particles.

6. The production process according to claim 1, wherein the countercurrent washing apparatus includes a first countercurrent washing unit and a second countercurrent washing unit each enclosing a movable part, and the polyarylene sulfide particles separated by the sieving are washed by countercurrent contact with a washing solvent that is miscible with the polar organic solvent and has a boiling point lower than water in the first countercurrent washing unit, and further washed by countercurrent washing with water in the second countercurrent contact unit.

7. The production process according to claim 6, wherein the polar organic solvent comprises N-methylpyrrolidone and the washing solvent comprises acetone.

8. The production process according to claim 6, wherein the polyarylene sulfide particles after the washing step are further re-slurried with an acidic liquid and washed by countercurrent contact with water in a third countercurrent washing unit.

9. The production process according to claim 5, wherein the polyarylene sulfide particles after the washing step are further re-slurried with an acidic liquid and washed by countercurrent contact with water.

* * * * *